H. C. MENARD.
TRANSMISSION MECHANISM.
APPLICATION FILED JAN. 31, 1917.

1,268,750.

Patented June 4, 1918.
2 SHEETS—SHEET 1.

INVENTOR
Hubert Charles Ménard
BY
Emil Bouwely cke
ATTORNEY

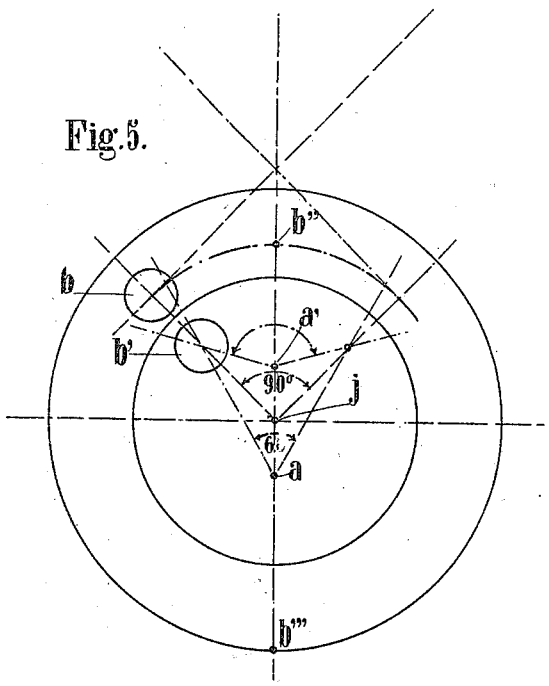
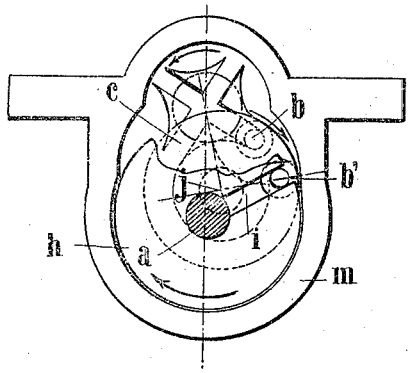
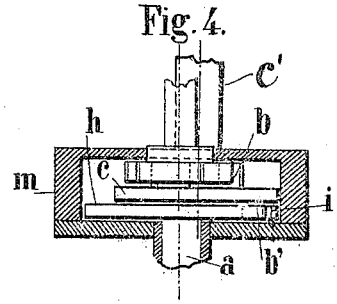

UNITED STATES PATENT OFFICE.

HUBERT CHARLES MÉNARD, OF ST. MAURICE, FRANCE.

TRANSMISSION MECHANISM.

1,268,750.  Specification of Letters Patent.  Patented June 4, 1918.

Application filed January 31, 1917. Serial No. 145,799.

*To all whom it may concern:*

Be it known that I, HUBERT CHARLES MÉNARD, citizen of the Republic of France, and resident of St. Maurice, Seine, France, have invented certain new and useful Transmission Mechanism, which is fully set forth in the following specification.

This invention relates to a mechanism for the transmission of movement by means of a Maltese cross, chiefly applicable to apparatus for taking or projecting cinematographic views, but adapted also to be used wherever it may be necessary to transform a continuous into an intermittent rotary motion. In order to make the following explanation as clear as possible, the transmission mechanism forming the subject of this invention is assumed to be applied to a cinematograph; but in view of the reservations just mentioned, this application is merely given by way of example.

In a cinematograph apparatus, it is necessary to convert a continuous rotary motion into an intermittent motion, as the image must be projected while it is stationary. In order to obtain a transmission of movement of that kind, in certain types of apparatus there is used a mechanism known under the name of Maltese cross.

It has been found that in order to insure perfect working, it was necessary—with a four arm Maltese cross, which is the one most generally used—to cause the driving finger to describe during its action on the cross, an angle of rotation of 90°.

In the accompanying drawing:

Fig. 3 is a diagrammatic view, in side elevation, of an improved form of Maltese cross driving mechanism embodying the principles of the present invention.

Fig. 4 is a transverse section of Fig. 3.

Fig. 5 is a diagram explanatory of the principles involved in the construction represented in Figs. 3 and 4.

Figure 1:
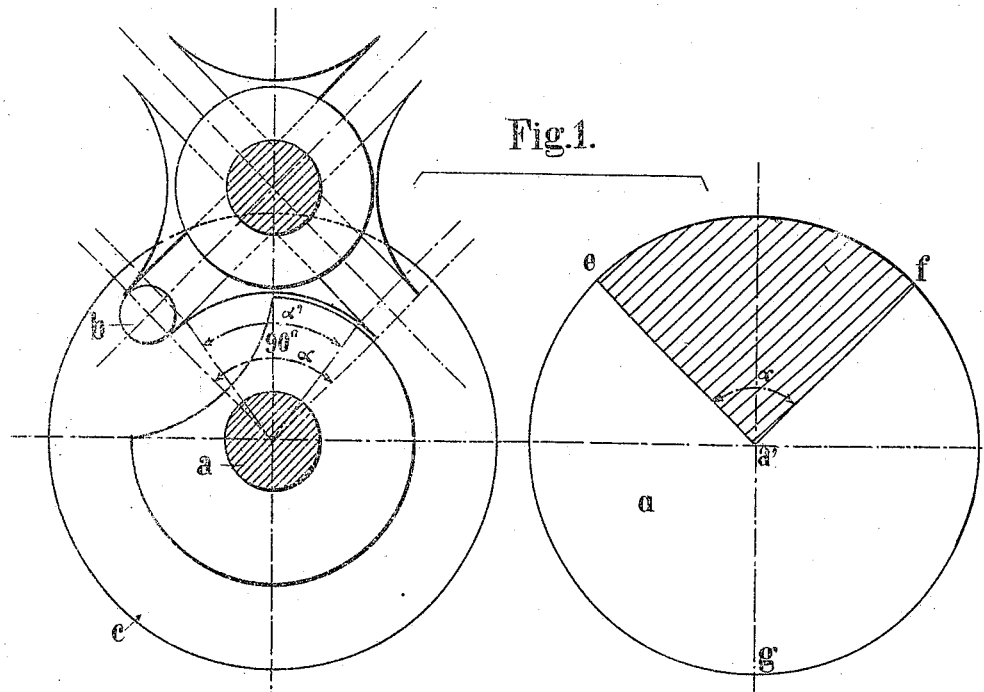
Figure 1 is a two-part, or compound, diagrammatic view, the left-hand part of which represents the ordinary Maltese cross driving mechanism of a cinematographic apparatus; and the right-hand part, the ordinary obturator used therewith.

As shown in Fig. 1, if $a$ is the shaft continuously rotated by hand or by an electric motor, and $b$ the driving finger mounted on a disk $c$, the angle $\alpha$ described by the finger during its action on the cross, will have to be 90° in order to obtain perfect working without any shocks and without an excessive pull on the film.

The continuously rotated shaft $a$ drives the obturator directly, or by means of a gear with any multiplication. For facilitating the description, it will be assumed that the driving is direct, that is to say, that to an angle $\alpha$ described by the disk $c$ keyed to the continuously rotating shaft $a$, corresponds the same angle $\alpha$ described by the obturator; but the reasoning mentioned hereinafter applies as a whole, with the exception of one factor, to the case of a gear with multiplication.

To a rotation $\alpha$ of the disk $c$ corresponds therefore the same angle $\alpha$ for the obturator. But as the film, in order to steady the image, must be shut off during the whole of its movement, the opaque portion $a'\ e\ f$ of the obturator which passes in front of the film during its movement, must have an angular extent of at least 90° (neglecting the extra obturation required for covering the luminous pencil). The open portion $a'\ e\ g\ f$ will then be 360°—90°=270°.

It has been now found that in order to avoid shimmering in projecting apparatus, it was necessary to have an obturator having alternately opaque and open sectors, the opaque sectors as well as the open ones, being as far as possible, equal to each other. An ideal obturator would be that shown in Fig. 2 in which the opaque sectors 1, 2, 3 are equal to each other and equal to the open sectors 1' 2' 3'; in this case, each sector has an angular extent of 60°. It is impossible to obtain this result if, when using an integral Maltese cross, it is necessary, as already stated, to give the obturation sector $a'\ e\ f$ an angular extent of 90°.

Figure 2:
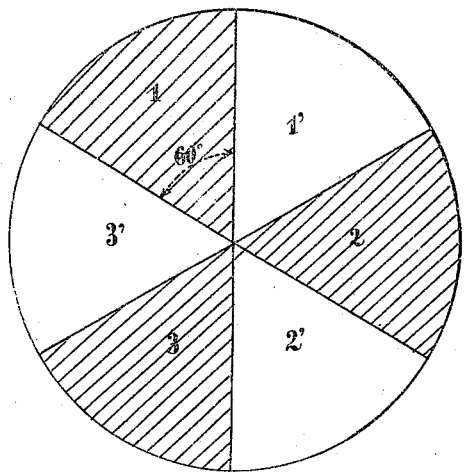
Fig. 2 is a diagrammatic view of a theoretical form of obturator which has been proposed.

In order to obtain an obturator, in which the proportion between the opaque and the open portions is very close to that in Fig. 2, the arms of the Maltese cross have been shortened in certain apparatus as shown in Fig. 1, so that the angle $\alpha$ described by the finger $b$ during the action on the cross is close to 60°. The obturator then gives good results, both from the point of view of steadying the image and from the point of view of the absence of shimmering, but the driving of the Maltese cross takes place with shocks and with an exaggerated pull on the film, so that the remedy is frequently worse than the evil.

The problem to be solved may be therefore put in the following manner:

To make the driving finger describe, during its action on the Maltese cross, an angle of 90° while using an obturator having alternately opaque and open sectors equal to each other, that is to say having sectors of an angular extent equal or near to 60°.

The device forming the subject of the present invention solves the problem and consists chiefly in interposing between the continuously rotating shaft driving the obturator, and the disk carrying the driving finger for the Maltese cross, a mechanical transmission or gear, with a uniformly varied movement, bringing about:

(1) During the movement of the Maltese cross, a rotation of the disk carrying the driving finger, through an angle of 90° for a rotation of 60° of the continuously rotated shaft.

(2) During the stoppage of the Maltese cross, a rotation of the disk carrying the driving finger, through an angle of 360° − 90° = 270° for a rotation of 360° − 60° = 300° of the continuously rotating shaft (in the calculation, the values of 60° and 90° are not absolute, and the proportion could be selected so as to give any other value to the angles through which the continuously rotating shaft and the driving finger turn).

In other words the invention consists in arranging between the continuously rotating shaft and the driving finger, such a mechanical transmission or gear that the speed of the driving disk relatively to the continuously rotating shaft, should reach the maximum during its action on the Maltese cross, and the minimum during the stoppage of the Maltese cross. A rotation through a complete revolution of the continuously rotating shaft corresponds however to a rotation through a complete revolution of the disk carrying the driving finger.

Various mechanical means can be used for carrying out the invention in practice; by way of example a simple arrangement shown in Figs. 3 and 4 will be described.

On the continuously rotating shaft $a$ driven by hand or by an electric motor, is mounted a disk $h$ provided with a slot $i$ in which is engaged a finger $b'$ mounted on the face of the disk $c$, the latter carrying on its other face the driving finger $b$ and being mounted to rotate about the center $j$ which does not coincide with the center $a$ of the disk $h$; the disk $c$ being mounted on a shaft $c'$ which passes through the case $m$, hereinafter referred to, at the opposite side from the shaft $a$. It will be readily understood that it will be possible to find such relative positions of two points $j$ and $a$ that, during its action on the cross (Fig. 5), the driving finger $b$ will describe about the point $j$ an angle of 90°, while the shaft $a$ will turn through an angle of 60°. If, as shown in Fig. 5, the fingers $b$ and $b'$ are arranged on one and the same radius of the disk $c$, the speed of the finger $b$ will reach the maximum at $b''$ and the minimum at $b'''$, and will be uniformly accelerated from $b''$ to $b'''$, and uniformly retarded from $b'''$ to $b''$.

The greater the distance of the point $a$ from $j$, the smaller will be the angle through which the continuously rotating shaft will have to turn for an angle of rotation of 90° of the finger $b$ about the center $j$. Obviously the fingers $b$ and $b'$ need not be arranged in practice (Figs. 3 and 4) on one and the same radius. In the same way, it will be understood that the fingers $b$ and $b'$ could be arranged in line with each other.

For certain applications, it may be necessary to increase the angle of rotation of the shaft $a$, instead of always decreasing it for the same angle of rotation of the finger $b$ about the point $j$. It will only be necessary, in order to fulfil that requirement; either to place the point $a$ at $a'$, (Fig. 5), while leaving the point $j$ in its place, it being understood that the Maltese cross remains in its original place; or to leave the centers $j$ and $a$ in their place, but to shift diametrically the Maltese cross.

It has been seen from the preceding that, by varying the respective positions of the centers $j$ and $a$, the speed of one of the movable bodies relative to the other is also varied. By a judicious selection of the respective positions of the centers $j$ and $a$ when designing the apparatus, it will be possible to fix the relative speed of the driving finger for the Maltese cross, or the angle described by the said finger during the driving for a given angle of rotation of the driving shaft during the same period of time. It is possible further to vary the relative speeds of the two movable parts in an apparatus already built. This variation could be obtained first of all by making it possible to alter, by some constructional device, the respective positions of the centers $j$ and $a$. Another and simpler way consists in modifying, for a given and immovable construction of centers $j$ and $a$, the respective positions of the fingers $b$ $b'$. To that end the finger $b'$ could be mounted for instance in a guide enabling the said finger to be shifted on the disk $c$.

In the device described, there could be used, without departing from the spirit of the invention, such a mechanical transmission between the disks $c$ and $h$ that to a complete revolution of the disk $c$ would correspond two or a greater number of complete revolutions of disk $h$, or conversely.

In the application of the mechanism to cinematographic apparatus, all the parts will be placed in a case $m$ with an oil bath, for the purpose of avoiding wear and noise, and of increasing smoothness of running.

The device forming the subject of the present invention, instead of being used with a Maltese cross, could be used with claw-driving devices used in certain cinematographic apparatus.

What I claim as my invention and desire to secure by Letters Patent is:—

1. A motion-transforming driving mechanism, comprising, in combination, a continuously-rotating shaft; an intermittently-acting driving part; and a mechanical connection between said driving part and said shaft, acting to accelerate the mean angular speed of the driving part during a portion of each revolution and to retard such speed during the remainder of the revolution.

2. A motion-transforming driving mechanism, comprising, in combination, a disk; an intermittently-acting driving part secured to said disk; a finger mounted on said disk; a continuously-rotating shaft; and a disk mounted on said shaft and provided with a slot wherein said finger is engaged; the two disks having their centers disposed out of alinement with each other.

3. A motion-transforming driving mechanism, comprising, in combination, a disk; an intermittently-acting driving part secured to said disk; a continuously-rotating shaft; and a disk mounted on said shaft; one of said disks being provided with a finger, and the other with a slot wherein said finger is engaged; the two disks having their centers disposed out of alinement with each other.

4. A motion-transforming driving mechanism, comprising, in combination, a rotatably-mounted Maltese cross; a disk; a driving finger acting intermittently on the arms of the Maltese cross and secured to said disk; a continuously-rotating shaft; a disk secured to said shaft; and a second finger provided on one of said disks, the other disk being provided with a slot wherein said finger is engaged; the two disks having their centers disposed out of alinement with each other.

5. A motion-transforming driving mechanism, comprising, in combination, a disk; an intermittently-acting driving part secured to said disk; a continuously-rotating shaft; and a disk mounted on said shaft; one of said disks having a slot therein, and the other having a finger engaged in said slot; means being provided for varying the relative positions of the centers of the disks.

In testimony whereof I have signed this specification in the presence of two subscribing witnesses.

HUBERT CHARLES MÉNARD. [L. S.]

Witnesses:
EMILE LEDRET,
GEORGE E. LIGHT.